(12) United States Patent
Franchino

(10) Patent No.: US 7,367,282 B1
(45) Date of Patent: May 6, 2008

(54) APPARATUS FOR REPELLING PREDATORS OF WATER-RESIDING SPECIES

(76) Inventor: Robert M. Franchino, 13755 Flagstaff Ave., Apple Valley, MN (US) 55124

( * ) Notice: Subject to any disclaimer, the term of this patent is extended or adjusted under 35 U.S.C. 154(b) by 147 days.

(21) Appl. No.: 11/257,635

(22) Filed: Oct. 25, 2005

Related U.S. Application Data

(60) Provisional application No. 60/678,157, filed on May 6, 2005.

(51) Int. Cl.
*A01K 29/00* (2006.01)
(52) U.S. Cl. ..................................... 119/219
(58) Field of Classification Search .................. None
See application file for complete search history.

(56) References Cited

U.S. PATENT DOCUMENTS 4,930,444 A * 6/1990 Vasile ........................ 119/223
5,596,947 A * 1/1997 Creppel et al. ............. 119/223
5,970,917 A * 10/1999 Keith, Jr. ..................... 119/223

* cited by examiner

*Primary Examiner*—Thomas Price
(74) *Attorney, Agent, or Firm*—Crawford Maunu PLLC

(57) ABSTRACT

According to one example embodiment, a predator repelling device is installed or placed in or near a water feature that has water-residing species that are vulnerable to predators. The device includes a base member for support and an extension arrangement coupled to and supported by the base member. The extension arrangement extends from the base member above and sufficiently close to the water for repelling predators. The extension arrangement includes an extension portion for providing access to a target location above the water and a motorized portion coupled to the extension portion for controlling the extension arrangement such as by repetitively and automatically sweeping the region surrounding the target location. Accordingly, when a predator attempts to breach the water feature the repetitive movement of the extension arrangement thwarts the predator's attempt and trains the predator to avoid the water feature.

28 Claims, 3 Drawing Sheets

APPARATUS FOR REPELLING PREDATORS OF WATER-RESIDING SPECIES

RELATED PATENT DOCUMENTS

This patent document claims benefit under 35 U.S.C. § 119(e) to U.S. Provisional Patent Application No. 60/678,157, entitled "Heron Chaser," filed on May 6, 2005.

FIELD OF THE INVENTION

The present invention relates generally to the prevention of predators attacking water-residing species.

BACKGROUND

Many homeowners choose to increase the ascetic value of their home by landscaping their property. One popular landscaping option is to include a water feature such as a pond in the yard. Often these ponds are stocked with fish and other selected species. Such ponds are similar to an indoor fish tank where the owner spends substantial time and resources to develop the water environment. Some fish and species that are introduced to the pond are often brightly colored so that they are easily seen in the pond water.

Whether brightly colored or otherwise, these pond-dwellers can be easy prey to a variety of predators. Consider for example, brightly colored or exotic goldfish stocked in a residential pond. Depending on the geography, such fish are hunted by birds such as herons and egrets as well as by mammals such as raccoons. In other geographic areas, ponds and contained bodies of water are inhabited by other hunted species which are pursued by a wide variety of animals and fowl.

Recognizing the significance of this issue, pond owners have gone to great lengths in attempting to protect their pond's inhabitants in a variety of ways. For example, many pond owners "drape" their ponds with netting to protect their fish from the attack of predators. Removing the net can be cumbersome and time consuming; hence, many pond enthusiasts leave the net on their ponds and do not get to enjoy the full beauty of their water feature. Others employ guard dogs to watch over the pond area. However, dogs are limited to policing shallow ponds and/or the edges of the water feature and disturb the pond's inhabitants. Other examples include constructing a chicken wire fence around the edge of the pond, layering chicken wire across the top of the pond at the water level, stringing fishing line across the pond, and motion-activated sprinklers. Each of these approaches provides limited success in repelling predators while also detracting from the ascetic value of the protected water feature.

The above and other difficulties continue to present challenges to the prevention of predators attacking water-residing species.

SUMMARY

The present invention is directed to overcoming the above-mentioned challenges and others related to the types of devices and applications discussed above. These and other aspects of the present invention are exemplified in a number of illustrated implementations and applications, some of which are shown in the figures and characterized in the claims section that follows.

Various aspects of the present invention are applicable to an apparatus for repelling predators from a region over a water environment. The apparatus comprises a base member to support the apparatus and an extension arrangement. The extension arrangement is coupled to and supported by the base member and extends from the base member above and sufficiently close to the water environment for repelling predators. The extension arrangement includes an extension portion to provide access to a target location in the region and a motorized portion coupled to the extension portion. The motorized portion controls the extension arrangement to provide repetitive movement for automatically sweeping the region.

Other aspects of the present invention are applicable to an apparatus for repelling predators from a region over a water environment where the apparatus includes a base member, an extension arm, and a rotating member. The extension arm has a first portion coupled to and supported by the base member and extends horizontally from the base member above the water environment. The rotating member is coupled to a second portion of the extension arm and is adapted to rotate parallel to the surface of the water environment.

Another example of the claimed invention is directed to a method for repelling predators from a region over a water environment. The method includes supporting a device for repelling predators and extending the device to the region over the water environment. The device is extended above the water environment sufficiently close to the water environment for repelling predators. The method further includes controlling the device to move repetitively and automatically through the region.

The above summary of the present invention is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the detailed description of various embodiments of the invention that follows in connection with the accompanying drawings, in which.

Figure 1:
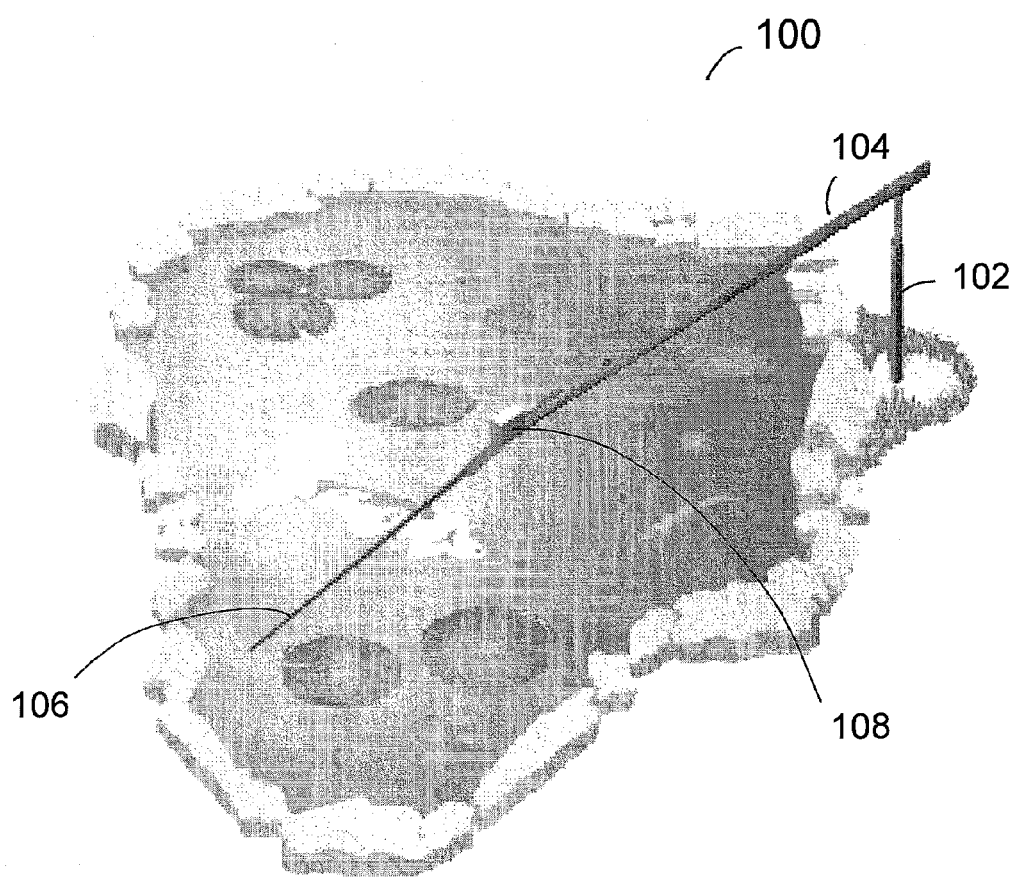
FIG. 1 illustrates an apparatus for repelling predators from a pond, according to an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present invention is believed to be useful for repelling and preventing predators from attacking water-residing species. While the present invention is not necessarily limited to such applications, various aspects of the invention may be appreciated through a discussion of various examples using this context.

In connection with an example embodiment of the present invention, a predator repelling device is installed or placed in or near a water feature that has water-residing species that are vulnerable to predators. The device includes a base member for support and an extension arrangement coupled to and supported by the base member. The extension arrangement extends from the base member above and sufficiently close to the water for repelling predators. The extension arrangement includes an extension portion for providing access to a target location above the water and a motorized portion coupled to the extension portion for controlling the extension arrangement such as by repetitively and automatically oscillating or sweeping the region surrounding the target location. Accordingly, when a predator attempts to breach the water feature the repetitive movement of the extension arrangement scares the predator, and the predator's attempt is thwarted. Thus, the predator is repelled and trained to avoid the water feature.

FIG. 1 illustrates an apparatus 100 for repelling predators installed next to a decorative pond, according to another example embodiment of the present invention. The base member 102 is cemented into the ground next to the pond and supports the device. Extension arm 104 extends out from the base member 102 at the right side of the pond. The apparatus also includes a rotating member 106 attached to a portion of the extension arm 104 located over the decorative pond. A motor 108 is located near the attachment location of the rotating member 106 to the extension arm 104.

Figure 2:
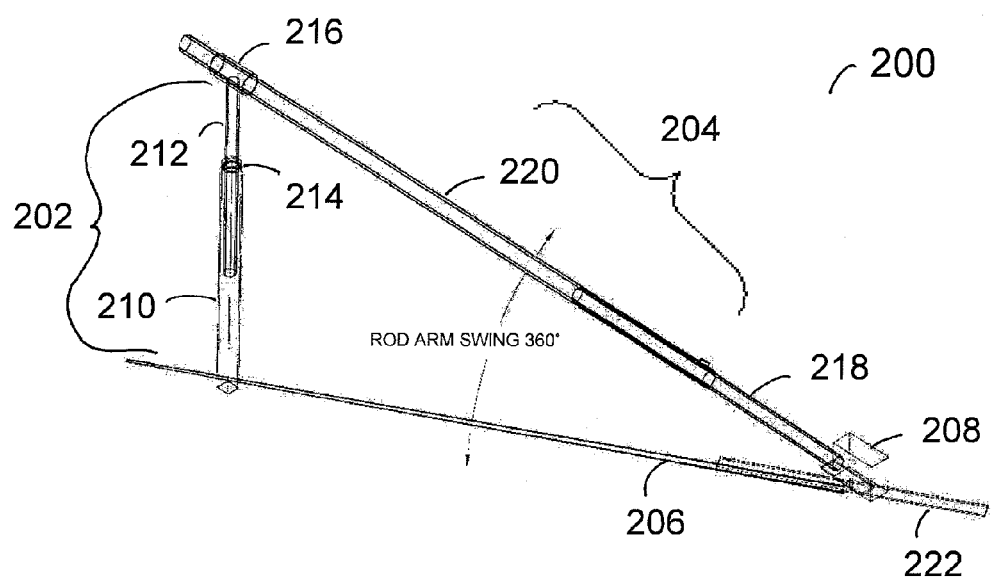
FIG. 2 is a drawing of an apparatus for repelling predators from a water environment, according to an example embodiment of the present invention.

FIG. 2 shows a predator chasing apparatus 200, according to another example embodiment of the present invention. Versatility of the predator chasing apparatus is achieved through the use of several adjustable components. One example being that the base member 202 can be both height adjusted and portable. An exemplary assembly of the base member 202 includes a main base support 210 which is vertically cemented into the ground as shown in FIG. 1. A tube 212 slides inside the main base support 210 and the height of the tube 212 can be adjusted, e.g., by tightening a nut on a collar 214 which prevents the tube 212 from sliding down into the main base support 210. A second tube 216 is fixed (e.g., welded) to the top of the first tube 212 which allows for the extension arm 204 to be attached. The second tube 216 also includes a tightening mechanism such as a bolt to secure the extension arm 204 into position.

The extension arm 204 may also be adjustable, for example, by being a combination of two concentric arm pieces. A first arm piece 218 slides into the second arm piece 220 and is locked in place by a locking mechanism at one end of the second arm piece 220. The second arm piece 220 slides into the second tube 216 of base member 202 to be secured at an appropriately adjusted length depending on the specific pond size. The rotating member 206 consists of a singular piece of fiberglass and is connected to the extension arm 204 via a metal bracket 222 and two "U" bolts. The metal bracket also includes a hole for a motor 208 arbor. The motor 208 is enclosed in a weather-tight protective box. The drive shaft extends out of the bottom of the box where the rotating member 206 is attached. These adjustable components allow the predator chasing apparatus 200 to be adapted for all pond sizes.

In a specific working embodiment of the present invention, the rotating member 206 rotates approximately 6"-12" inches above the surface of the water and is an eight foot long tapered fiberglass rod. It is recognized that the height of the rotating member and extension arm are adjusted according to the height of the anticipated predator to be repelled and the depth of the pond. For example, if the predator is an approximately four feet tall heron wading into a pond two feet deep, the height of the rotating member should be no more than eighteen inches above the surface of the pond to prevent the heron from ducking under the rotating member 206. The material of the rotating member (e.g., fiberglass) is strong enough not to bow into the water but flexible enough not to harm the predator or pond landscaping.

The apparatus 200 can also be reconfigured to offer a more aesthetically appealing view of the water environment by swiveling the extension arm 204 and rotating member 206 off to the side of the water environment, or the apparatus 200 can be completely removed from the water environment. For example, the base member 202 includes a bracket that sits on the surface of the ground rather than cementing main base support 210 in the ground. The bracket includes an area for a counterweight that provides stability for the unit. This portable configuration provides the ability for the apparatus to be moved anywhere on or around a water environment and provides for easier installation. The apparatus 200 can provide protection from predators twenty-four hours a day, seven days a week.

Figure 3:
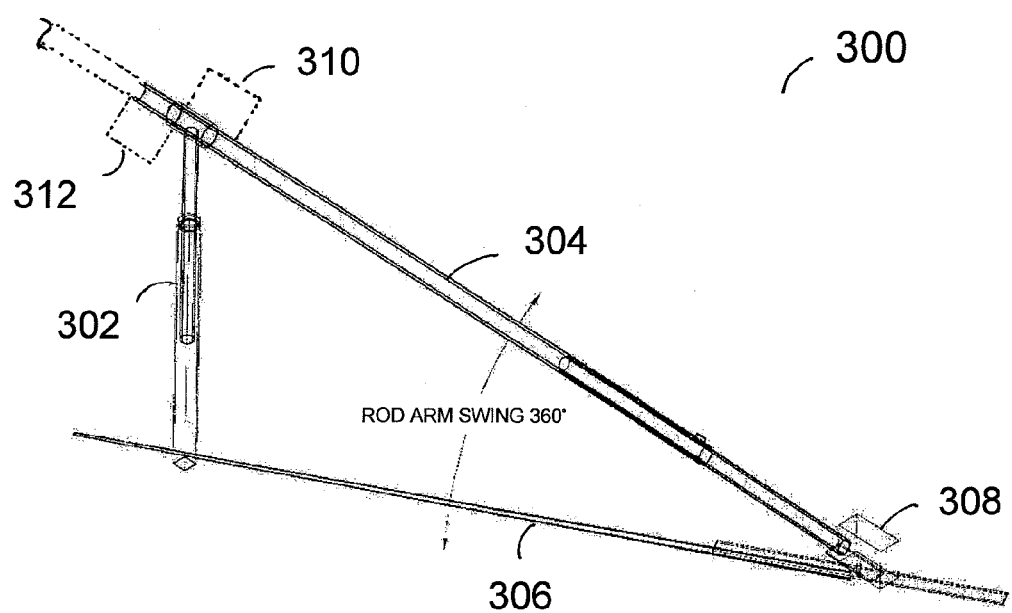
FIG. 3 is a drawing showing optional aspects for implementing alternative configurations of an apparatus for repelling predators from a water environment, according to example embodiments of the present invention.

FIG. 3 shows a predator chasing apparatus 300 with optional aspects for implementing alternative configurations, according to other example embodiments of the present invention. One of the configurations of FIG. 3 illustrates the optional inclusion of a second motor 310. Motor 310 is located at the area where extension arm 304 attaches to main base support 302. Motor 310 controls extension arm 304 which may (be preset to) include complete three hundred sixty degree rotation or oscillation of a smaller degree range to sweep back and forth. If the surface area of the water environment is such that extension arm 304 spans the surface, rotating member 306 and motor 308 may not be necessary. With such a configuration, counterweight 312 is added to extension arm 304 to balance the apparatus 300. In another example embodiment, extension arm 304 may also extend in the opposite direction from motor 310 acting as its own counterweight and alleviating the need for counterweight 312.

In another example embodiment, motors 308 and 310 operate in a dual motor configuration via a pulley arrangement. The drive shaft of motor 310 turns a band connected to the drive shaft of motor 308 and, via the pulley, controls motor 308 and the rotation of rotating member 306.

Other embodiments include variations of the extension arm 304 and rotating member 306. For example one or both are collapsible or telescoping so as to minimize the apparatus 300's intrusion on the pond owner's ascetic enjoyability of the pond. One or both of extension arm 304 and rotating member 306 are removed from view, for example when the apparatus is not in use. Also, the apparatus includes a locking mechanism (e.g., a magnet) to secure the rotating member 306 under the extension arm 304 when repositioning the apparatus 300 off to the side of the pond.

Other embodiments include the apparatus 300 providing coverage for an irregularly shaped water environment. In one implementation, sensors are located along the irregular edge of the water environment so as to communicate the shape of the shoreline to a circuit control module (not shown) within or communicatively coupled to the apparatus 300. In response to the feedback from the sensors, the circuit control module sends command signals for controlling the position(s) of either the extension arm 304 or the rotating member that it is retracted or elongated to correlate the span of the extension arm 304 or rotating member 306 to the shoreline. The retraction and elongation is controlled by a motor, such as motor 308, which receives the command signals for rotating member 306. This irregular coverage can also be achieved through the use of a cam device in cooperation with rotating member 306 or extension arm 304. The irregular coverage prevents predators from accessing cove-type features of a water environment that would not otherwise be reached by the apparatus 300. In various other applications such as garage-door open/close controllers and winch-control equipment for moving equipment and boats, such sensors are conventional; for the instant predator-repelling application, the same types of sensors can be used along with relatively small motors having control input ports for receiving the commands.

In another example embodiment one or both of motors 308 and 310 are remote controlled. This allows a user to activate or deactivate the predator repelling apparatus from a remote location. One specific example includes an owner being inside a house and seeing a predator approaching a pond. To activate the apparatus and repel the predator, the owner merely pushes a button on the remote control. In another example embodiment, the apparatus 300 includes a built-in timer to permit pond owners to control the start and stop times for movement (e.g., rotation) of the apparatus 300.

In another working environment, motor 308 or 310 is a Motion Industries 25 RPM AC gear motor used to turn the rotation arm. The motor 308 is mounted to an aluminum mounting plate which is fastened to the end of the extension arm 304. One or both motors 308 and 310 use a modified 7"×5"×3" Radio Shack Project Enclosure (model 270-1807) to encase the motor. Modifications to the enclosure include a cut out on one side of the box to allow for the extension arm 304 to enter as well as a one inch hole in the bottom of the box for the motor shaft to exit the box.

Other example embodiments include a variety of power options. For example, the apparatus has a power switch to allow starting and stopping the apparatus 300 easily without unplugging. The apparatus 300 also includes an additional 110 AC outlet so that multiple predator repellers are daisy-chained together and operated from a single switch on one of the repellers. This configuration is particularly useful when the water surface area is large enough to require more than one apparatus on the same water feature (e.g., one apparatus guards half of the water surface while another apparatus located opposite the first apparatus guards the other half of the water feature's surface).

In yet other embodiments directed to training, the embodiment of FIG. 1 and FIG. 2 is operated as described above to train predators to avoid the guarded region of the water feature. Once trained, the apparatus 100 is temporarily collapsed to the side of the water feature (without moving the base support). As an added feature, the rotating member 106 is decoupled from the motor, and in its place a colored laser (pen) light is remotely activated and controlled via the motor to continue the appearance of the sweeping and/or oscillating movement.

It is also readily recognized that the above-discussed components of various embodiments of the present invention may be packaged and sold as an assembly that is customizable by the user of the predator repelling apparatus. For instance, the user selects a particular type of base member (e.g., permanent or portable), a particular type of extension arm (e.g., collapsible or telescoping), and a motor configuration (e.g., one or two). The possible combinations may be manipulated to meet the needs of most all pond owners.

While certain aspects of the present invention have been described with reference to several particular example embodiments, those skilled in the art will recognize that many changes may be made thereto without departing from the spirit and scope of the present invention. Aspects of the invention are set forth in the following claims.

What is claimed is:

1. An apparatus for repelling predators from a region over a water environment, the apparatus comprising:
  a base member to support the apparatus;
  an extension arrangement coupled to and supported by the base member, the extension arrangement adapted to extend from the base member for movement above and sufficiently close to the water environment to repel predators, the extension arrangement having
    an elongated extension portion to provide access to a target location in the region, and
    a motorized portion coupled to the extension portion, to control the extension arrangement for moving repetitively and automatically without manual intervention through the region.

2. The apparatus of claim 1 wherein the base member is adapted to be stabilized adjacent a perimeter region of the water environment, and wherein the extension arrangement includes a rotating member coupled to the extension portion, the rotating member adapted to rotate substantially parallel to the surface of the water environment.

3. The apparatus of claim 1 wherein the base member is adapted to be stabilized without a flotation apparatus, and the extension portion extends significantly beyond the base member to reach the target location.

4. The apparatus of claim 1 wherein moving repetitively and automatically through the region includes rotating at least a portion of the extension arrangement in a three hundred sixty degree circle.

5. The apparatus of claim 1 wherein moving repetitively and automatically through the region includes oscillating at least a portion of the extension arrangement back and forth.

6. The apparatus of claim 1 wherein the motorized portion includes a motor, and the extension portion includes a boom extension coupled to the base member and a rotating member extending from the boom extension, where the rotating member is controlled by the motor.

7. The apparatus of claim 6 wherein the motorized portion is a motor fixed to the boom extension near an end of the boom extension adjacent the rotating member.

8. The apparatus of claim 1 wherein the motorized portion is a motor, and the extension portion is controlled by the motor.

9. The apparatus of claim 1 further including counterweights coupled to at least one of the extension arrangement and the base member, the counterweights arranged for stabilization.

10. The apparatus of claim 1 wherein the extension portion is retractable.

11. The apparatus of claim 1 wherein the extension portion is collapsible.

12. The apparatus of claim 1 wherein the extension portion locates the motorized portion distal from the base member and the motorized portion includes a motor and a rotating member controlled by the motor.

13. The apparatus of claim 1 wherein the motorized portion includes a motor coupled to the extension portion where a rotating member is coupled to the extension portion.

14. The apparatus of claim 1 wherein the motorized portion includes a first motor coupled to the extension portion where the extension portion is coupled to the base member and a second motor coupled to the extension portion where a rotating member is coupled to the extension portion.

15. An apparatus for repelling predators from a region over a water environment, the apparatus comprising:
   a base member;
      an extension arm, having a first portion coupled to and supported by the base member, the extension arm adapted to extend from the base member for movement above the water environment; and
      a rotating member coupled to a second portion of the extension arm and adapted to rotate along and above the surface of the water environment to repel predators from the region over the water environment.

16. The apparatus of claim 15 wherein the rotating member rotates in a three hundred sixty degree circle.

17. The apparatus of claim 15 wherein the rotating member oscillates back and forth.

18. The apparatus of claim 15 further including counterweights secured to the extension arm near the base member.

19. The apparatus of claim 15 wherein the rotating member includes counterweights.

20. The apparatus of claim 15 wherein the extension arm and the rotating member include counterweights.

21. The apparatus of claim 15 wherein the extension arm is retractable.

22. The apparatus of claim 15 wherein the extension arm is collapsible.

23. The apparatus of claim 15 further including a motor coupled to the first portion of the extension arm.

24. The apparatus of claim 15 further including a motor coupled to the second portion of the extension arm.

25. The apparatus of claim 15 further including a first motor coupled to the first portion of the extension arm and a second motor coupled to the second portion of the extension arm.

26. The apparatus of claim 15, wherein the length of the rotating member is adjusted as a function of the shape of the water environment.

27. An apparatus for repelling predators from a region over a water environment, the apparatus comprising:
   means for supporting the apparatus;
   extension means for providing access to the region over the water environment coupled to and supported by the support means, the extension means adapted to extend from the support means for movement above and sufficiently close to the water environment to repel predators, the extension means also for
   providing access to a target location in the region, and
   controlling the extension means to move repetitively and automatically through the region.

28. A method for repelling predators from a region over a water environment, the method comprising:
   supporting a device for repelling predators; and
   extending the device to the region over the water environment including extending the device above the water environment and sufficiently close to the water environment for repelling predators, and controlling the device to move repetitively and automatically through the region to repel predators from the region.

* * * * *

UNITED STATES PATENT AND TRADEMARK OFFICE
CERTIFICATE OF CORRECTION

PATENT NO. : 7,367,282 B1  Page 1 of 1
APPLICATION NO. : 11/257635
DATED : May 6, 2008
INVENTOR(S) : Robert M. Franchino It is certified that error appears in the above-identified patent and that said Letters Patent is hereby corrected as shown below:

Col. 7, line 12, Claim 15: "extend from" should read --extend horizontally from--.

Signed and Sealed this

Sixteenth Day of December, 2008

JON W. DUDAS
*Director of the United States Patent and Trademark Office*